Sept. 20, 1938.  H. ULLRICH  2,130,938
BRAKE APPLYING MECHANISM
Filed Feb. 6, 1937
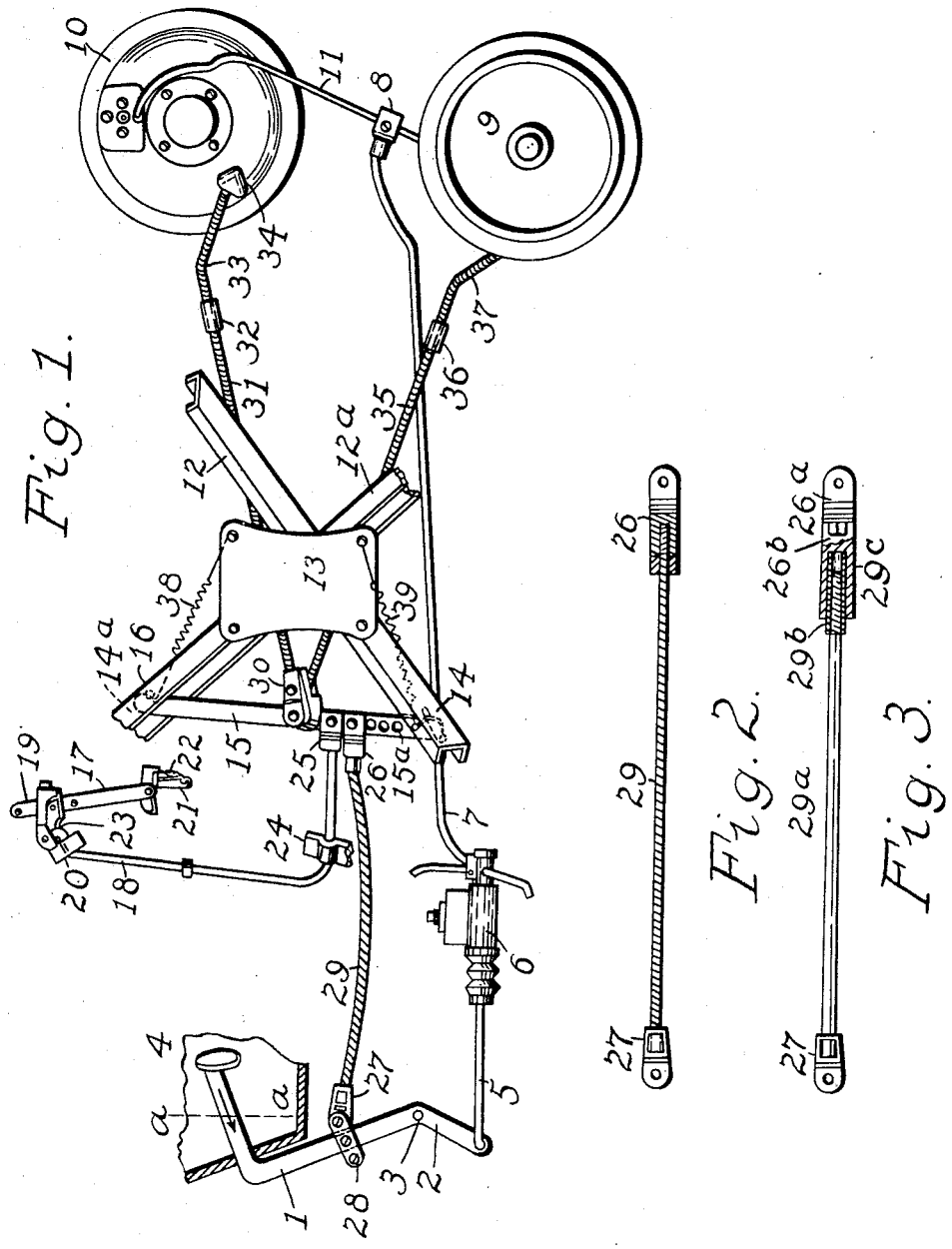
Inventor
Herman Ullrich,
By G.C. Kennedy
Attorney Patented Sept. 20, 1938

2,130,938

UNITED STATES PATENT OFFICE 2,130,938

BRAKE-APPLYING MECHANISM

Herman Ullrich, Cedar Falls, Iowa

Application February 6, 1937, Serial No. 124,375

2 Claims. (Cl. 188—106)

My invention relates to improvements in brake-applying mechanism, and the object of my improvements is to supply auxiliary mechanical means for loose connection with hydraulic brakes and with the starting mechanism therefor, whereby the brakes, in case fluid pressure therefor fails, may nevertheless be instantly operated by a single and continued starting movement of the braking pedal alone.

This object I have achieved by means of the additional and allied elements combined with the hydraulic braking mechanism and which are illustrated in the accompanying drawing, also described in the appended specifications and claimed in the claims therefor.

It is to be understood that various modifications in the details of construction and joint connections of the auxiliary means above described with one or more hydraulic brakes and the single starting device therefor may be made without departure from the principle and scope of the invention as defined in the claims herein.

In the drawing, Fig. 1 is a diagrammatic view of my auxiliary means for continuously operating hydraulic brakes in case of their failure for any cause, such means showing a controlling starting pedal lever and its loose connections with the brake-heads of hydraulic brakes, parts being broken away or in section, or removed from a complete assemblage. Fig. 2 is an enlarged detail view of one type of loose connection for the above combination, and Fig. 3 is an enlarged detail view of another type therefor.

Referring to said Fig. 1, the numeral 1 denotes the angular stem of a lever having a pedal termination 4 above the car body structure, and pivoted at 3 to any supporting structure not shown, the rearwardly bent upper portion of said stem traversing an opening in the body, and the stem below the pivot 3 having a pivotal connection terminally with the forward end of a piston-rod 5 of a master cylinder 6, all as according to well-known construction.

The numerals 9 and 10 denote like rear casings for and to contain the usual operating elements of hydraulic brakes, which latter are therefore not specifically shown and described.

The numeral 12 denotes parts of the cross-beams of the chassis structures, connected medially by means of a plate 13 thereacross and rigidly secured thereto. It will be understood that other parts of the chassis of a car are used for the support of the diagrammed structures, as usual. The master cylinder 6 has a plurality of pipes such as shown at 7 and 11, with the cross connection 11 including an angle-coupling 8, other pipes from said cylinder not being shown in full but broken away, the exemplification of this invention being for convenience restricted as shown to the pair of like rear casings 9 and 10, the other and broken away pipes being for communication in like manner with a pair of forward hydraulic brake casings not shown.

The channel-beams 12 and 12a medially rigidly connected by means of the said plate 13, have forward of said plate in their webs narrow longitudinal slots 14 and 14a respectively. A lever 15 has its terminations traversing said slots, one terminal edge of the lever having a notch at 16 to fit about one edge of the slot 14a to serve as a fulcrum for the lever at this location, and so that the lever may freely rock in the slot with a disengagement. The opposite end of this lever passes freely through the opposite slot 14 to limitedly swing therein. Like coiled springs 38 and 39 have end hooks which respectively are secured in eyes at the rear of the plate 13, and forwardly in eyes or holes at opposite ends of the lever.

The numeral 18 denotes a curvilinearly bent tube receiving and guiding a flexible wire connected to a swivel 25 pivoted to and about medially of the lever 15. The opposite termination of the tube 18 has a head bracket at 19 with which a detent lock member on an arm or swingable lever 17 may be releasably engaged, the bracket having a clamp 20 on the tube 18. The lever 17 is connected to the other end of the wire 23 and is swingingly pivoted on a support 21 with a resilient mounting on the chassis, however this mechanism represents one type of a lever connection with the first lever 15, adapted for manual actuation of the brake members in the brake casings 9 and 10, in case of fluid failure of the brake-heads to function when the fluid contents of the master cylinder are deficient therein and in the brake actuating devices in the casings.

Separate swivel heads 30 are pivoted medially to the lever 15, and these heads are fixed on rope connections 31 and 35 forwardly, the rear terminations of these ropes having connecting sleeves 32 and 36 respectively with flexible members 33 and 37, whose rear ends traverse openings at 34 in the casings 9 and 10 and have operating connections within the casings with the brake-heads therein. Referring again to the bent tube 18, the numeral 23 denotes a wire which flexibly traverses the tube, and its outer end is connected to the outer end of the lever 17. The inner end of this wire 23 is secured to said swivel 25, the tube 24 being supported fixedly in a clamp 24 on the chassis not shown.

The numeral 29 denotes a flexible wire rope having on its forward end a swivel-head 27 which is pivotally connected to a clamping device 28 secured upon the lever 1 above its pivot 3. The rear end of the rope 29 has a like swivel-head 26 which may be connected by a cross pin to the lever 15, adjustably therealong, in any of the alined holes 15a of the lever.

There is shown in Fig. 2 an enlarged representation of said rope connection 29 with its fixed forward swivel-head 27, but the rear swivel-head 26 has an interiorly threaded shank which adjustably seats therein a threaded part of a ring member fixed on the adjacent end of the rope 29, to permit of adjustments of the latter between the levers 1 and 15.

Fig. 3 illustrates a modified construction of the loose connection between said swivel-heads 27 and 26, where there is substituted for the wire rope 29, a rigid rod 29a between said levers. The swivel-head 26a has a tubular shank having along opposite sides the like opposite slots longitudinal therewith in which studs 29c on the adjacent end part of the head part 29b of the rod 29a may limitedly slide to and fro. It will be seen, that both of these loose connections shown in said Figs. 2 and 3, are mechanical equivalents of each other in connecting said levers 4 and 15.

The above loose connections shown in Figs. 2 and 3, may either be employed in the connecting of the levers 1 and 15, in being normally inoperative when the hydraulic brakes of a car are sufficiently served by the fluid in the master cylinder 6, or by any other cause which does not invalidate the action of the brake-heads. When the hand-lever 17 is used to actuate the lever 15 and its connections 31 and 35 to the brake-heads, the driver, in case the fluid action of the contents of the cylinder 6 is insufficient to set the brakes, may reach to and manually rock the lever 17 to thus cause the mechanical setting of the brake-heads in case of an emergency and where the hydraulic action from the master cylinder 6 is not sufficiently effective. However, there may be cases where the driver cannot take time to use the lever 17 when some accident or obstruction occurs or is present in the path of the speeding car, and on this account the applicant has furnished the loose connection which at 29 or 29a connects the pedal lever 1 directly to the medial lever 15. This connection 29, or 29a, as the case may be, being a loose one and normally inoperative on the brakes during the ordinary use of the lever 1, becomes operative when the driver, feeling the loss of braking effect by the shifting of the lever 1 to a normal distance forward corresponding to the ordinary limit of movement of the lever indicated by the dotted line a—a in Fig. 1, simply without a break in the continuity of his foot pressure forwardly on the pedal 4, widens the scope of swinging of the lever 1, which renders the wire rope connection 29, or the corresponding loose connection of Fig. 3 taut, and thus moves the medial lever 15 with the rope connections 31 and 35, to set the brakes solely mechanically.

It is evident, that this combination of devices permits a minimum loss of time in setting the brakes mechanically, and to certainly actuate the brakes when not being operative hydraulically. This speed and certainty of action of the invention renders the setting of the brakes practically instantaneous, with the desired certainty of saving life and limb, as well as property damage to the car, or to an approaching vehicle and its passengers.

I claim:

1. The combination with a hydraulic brake mechanism and its hydraulically controlled brake drums and inclosed brake-heads, of a hydraulic pressure means, a pedal lever pivoted intermediate its ends, an operating connection between the lower end of the lever and said hydraulic pressure means, the latter being in operative association with said brake drums and brakes, mechanical operating devices for actuating the brake-heads and connected thereto independently, including an end-pivoted lever, and a flexible connection between said levers, and untensed to be tensed only when said hydraulic pressure means fail, whereby continued further movement of the pedal lever will first place under tension said flexible connection and then shift the end-pivoted lever and mechanical operating devices to set the brakes.

2. The combination with a hydraulic brake mechanism and its hydraulically controlled brake drums and inclosed brake-heads, of a hydraulic pressure means, a pedal lever pivoted intermediate its ends, an operating connection between the lower end of the lever and said hydraulic pressure means, the latter being in normally operative association with said brake-drums and brake-heads, mechanical operating devices including an end-pivoted lever for actuating the brake-heads and connected thereto idly normally, and a flexible cable device adjustably connected to and between said levers, end-connected to the pedal lever above its pivot, and an adjustable head member for the cable, the cable being untensed to be tensed only when said hydraulic pressure means fail, when the continuous further movement of the pedal lever will first tension the cable device and then by means of said mechanical connections shift and set the brakes without interruption.

HERMAN ULLRICH.